US010009958B2

(12) United States Patent
Dimitrijevic et al.

(10) Patent No.: US 10,009,958 B2
(45) Date of Patent: Jun. 26, 2018

(54) TRANSPARENT PANE WITH HEATABLE COATING

(71) Applicant: SAINT-GOBAIN GLASS FRANCE, Courbevoie (FR)

(72) Inventors: Bojan Dimitrijevic, Bochum (DE); Valentin Schulz, Niederzier (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 72 days.

(21) Appl. No.: 15/301,354

(22) PCT Filed: Mar. 5, 2015

(86) PCT No.: PCT/EP2015/054556
§ 371 (c)(1),
(2) Date: Sep. 30, 2016

(87) PCT Pub. No.: WO2015/158461
PCT Pub. Date: Oct. 22, 2015

(65) Prior Publication Data
US 2017/0118803 A1    Apr. 27, 2017

(30) Foreign Application Priority Data

Apr. 17, 2014  (EP) .................................. 14165080

(51) Int. Cl.
*H05B 3/84*    (2006.01)
*B05D 1/28*    (2006.01)
(Continued)

(52) U.S. Cl.
CPC ................. *H05B 3/84* (2013.01); *B05D 1/28* (2013.01); *B32B 17/10036* (2013.01);
(Continued)

(58) Field of Classification Search
CPC ...... H05B 3/84; H05B 3/86; H05B 2203/008; H05B 2203/011; H05B 2203/013; B32B 17/10036; B32B 17/10174; B05D 1/28
(Continued)

(56) References Cited

U.S. PATENT DOCUMENTS 7,626,749 B2 * 12/2009 Baur ................. B32B 17/10174
                                                                    359/265
7,636,188 B2 * 12/2009 Baur ................. B32B 17/10174
                                                                    359/265
(Continued)

FOREIGN PATENT DOCUMENTS

DE    102008018147 A1    10/2009
DE    102008029986 A1    1/2010
(Continued)

OTHER PUBLICATIONS

International Search Report for PCT/EP2015/054556 filed on behalf of Saint-Gobain Glass France, dated Mar. 31, 2015. 7 pages.

*Primary Examiner* — Eric Stapleton
(74) *Attorney, Agent, or Firm* — Steinfl + Bruno LLP (57) ABSTRACT

A transparent pane having an electrically heatable coating and at least one coating-free zone that can be used, for example, as a communication window, is disclosed. The electrically heatable coating is connected to two collecting electrodes, such that a supply voltage applied to the electrodes generates a heating current that flows via a heating field formed between the collecting electrodes, the heating field containing the coating-free zone whose zone-edge is formed, at least in sections, by the heatable coating. Other implementation details include subdivision of one of the two collecting electrodes into separated subregions, each connected, via an electrical supply line, to an additional electrode. In one case, the electrical supply line runs, at least in sections, in the coating-free zone, in a coating-free edge
(Continued)

strip, in a subregion of the coating outside the heating field, and/or in the zone-edge. Methods for producing the transparent pane are also disclosed.

15 Claims, 6 Drawing Sheets (51) Int. Cl.
*H05B 3/86* (2006.01)
*B32B 17/10* (2006.01)

(52) U.S. Cl.
CPC ......... *B32B 17/10174* (2013.01); *H05B 3/86* (2013.01); *H05B 2203/008* (2013.01); *H05B 2203/011* (2013.01); *H05B 2203/013* (2013.01)

(58) Field of Classification Search
USPC ........................................................ 219/522
See application file for complete search history.

(56) References Cited

U.S. PATENT DOCUMENTS

| | | | | |
|---|---|---|---|---|
| 7,859,738 B2* | 12/2010 | Baur | ................ | B32B 17/10174 359/265 |
| 8,254,011 B2* | 8/2012 | Baur | ................ | B32B 17/10174 359/265 |
| 8,431,867 B2* | 4/2013 | Blanchard | ......... | B32B 17/10036 219/203 |
| 8,503,062 B2* | 8/2013 | Baur | ................ | B32B 17/10174 359/265 |
| 8,654,433 B2* | 2/2014 | Baur | ................ | B32B 17/10174 359/265 |
| 9,469,252 B2* | 10/2016 | Baur | ................ | B32B 17/10174 |
| 2002/0045037 A1* | 4/2002 | Boire | ....................... | C03C 17/36 428/216 |
| 2008/0212189 A1* | 9/2008 | Baur | ................ | B32B 17/10174 359/604 |
| 2009/0080055 A1* | 3/2009 | Baur | ................ | B32B 17/10174 359/267 |
| 2009/0166347 A1* | 7/2009 | Blanchard | ......... | B32B 17/10036 219/201 |
| 2010/0066519 A1* | 3/2010 | Baur | ................ | B32B 17/10174 340/435 |
| 2011/0102167 A1* | 5/2011 | Baur | ................ | B32B 17/10174 340/439 |
| 2011/0108537 A1* | 5/2011 | Schall | ............... | B32B 17/10036 219/201 |
| 2012/0103961 A1* | 5/2012 | Offermann | ............... | H05B 3/84 219/203 |
| 2012/0193341 A1* | 8/2012 | Reul | ............... | H05B 3/84 219/203 |
| 2012/0320444 A1* | 12/2012 | Baur | ................ | B32B 17/10174 359/267 |
| 2013/0213949 A1* | 8/2013 | Lisinski | ................... | H05B 3/84 219/203 |
| 2013/0314760 A1* | 11/2013 | Baur | ................ | B32B 17/10174 359/267 |
| 2014/0192520 A1* | 7/2014 | Baur | ................ | B32B 17/10174 362/135 |
| 2017/0028924 A1* | 2/2017 | Baur | ................ | B32B 17/10174 |

FOREIGN PATENT DOCUMENTS

| | | |
|---|---|---|
| DE | 202008017611 U1 | 4/2010 |
| EP | 0847965 A1 | 6/1998 |
| EP | 2334141 A1 | 6/2011 |
| FR | 2592544 A1 | 7/1987 |
| GB | 2381179 A | 4/2003 |
| WO | 2011006743 A1 | 1/2011 |
| WO | 2012031907 A1 | 3/2012 |
| WO | 2012031908 A1 | 3/2012 |
| WO | 2012052315 A1 | 4/2012 |

\* cited by examiner

TRANSPARENT PANE WITH HEATABLE COATING

CROSS REFERENCE TO RELATED APPLICATIONS

The present application is the US national stage of International Patent Application PCT/EP2015/054556 filed internationally on Mar. 5, 2015 which, in turn, claims priority to European Patent Application No. 14165080.4 filed on Apr. 17, 2014.

The invention relates generically to a transparent pane with an electrically heatable coating according to the generic portion of the independent claims.

Moreover, the invention relates to a method for producing the transparent pane.

The invention further relates to the use of the transparent pane.

Transparent panes with an electrical heating layer are well known per se and have already been described many times in the patent literature. Merely by way of example, reference is made in this regard to the German published patent applications DE 102008018147 A1 and DE 102008029986 A1. In motor vehicles, they are frequently used as windshields, since, by law, the central visual field must have no vision restrictions, with the exception of heating wires. By means of the heat generated by the heating layer, condensed moisture, ice, and snow can be removed in a short time. Usually, such panes are produced as composite panes, in which two individual panes are bonded to one another by a thermoplastic adhesive layer. The heating layer can be applied on one of the inner surfaces of the individual panes, with, however, other structures also known, wherein the heating layer is situated on a carrier that is arranged between the two individual panes.

The heating layer is usually electrically connected to at least one pair of strip- or band-shaped collecting electrodes ("busbars"), which are intended to introduce the heating current as uniformly as possible into the coating and to distribute it widely. For an attractive aesthetic appearance of the pane, the nontransparent collecting electrodes are covered by opaque masking strips.

In general, the specific heating output $P_{spec}$ of a heatable coating can be described by the formula $P_{spec}=U^2/(R_\square \cdot D^2)$, where U is the feed voltage, $R_\square$ is the electrical sheet resistance of the coating, and D is the distance between the two collecting electrodes. The sheet resistance $R_\square$ of the coating is, with the materials currently used in industrial series production, on the order of a few ohms per square unit of area ($\Omega/\square$).

In order to obtain a satisfactory heating output for the desired purpose with the onboard voltage of 12 to 24 volts standardly available in motor vehicles, the collecting electrodes should have the least possible distance D between them. In light of the fact that the resistance R of the heatable coating increases with the length of the current path and since the motor vehicle panes are usually wider than they are high, the collecting electrodes are normally arranged along the upper and lower pane edge such that the heating current can flow via the shorter path of the height of the window pane.

But, panes with an electrical heating layer block electromagnetic radiation relatively strongly such that, in particular in motor vehicles with a heatable windshield, radio data traffic can be significantly compromised. Heatable windshields are, consequently, frequently provided with coating-free zones ("communication windows or sensor windows"), which are quite permeable at least to certain ranges of the electromagnetic spectrum, to thus enable trouble-free data traffic. The coating-free zones, on which electronic devices, such as sensors and the like, are frequently situated, are commonly arranged in the vicinity of the upper edge of the pane, where they can be well concealed by the upper masking strip.

However, coating-free zones compromise the electrical properties of the heating layer, affecting, at least locally, the current density distribution of the heating current flowing through the heating layer. Actually, they cause a highly inhomogeneous heating output distribution, with the heating output clearly reduced below and in the area surrounding the coating-free zones. On the other hand, sites with a particularly high current density ("hot spots") appear, in which the heating output is highly increased. As a result, very high local pane temperatures can appear, which present a danger of burns and impose great thermal stresses on the panes. In addition, adhesion points of parts mounted thereon can be loosened thereby.

Experts have attempted to remedy this problem by the shaping of the heating field and/or the collecting lines and/or the installation of a third collecting line.

Thus, for example, a heatable windshield is known from the British patent application GB 2381179 A, whose heating layer is divided into at least two fields or zones that are separated from one another by uncoated regions. The coating-free communication window is situated in the central zone of the coating. The upper bus bar in the installed state is guided around three edges (horizontal lower edge and the two vertical side edges running parallel to one another) of the communication window. The subsections of the busbar running along the two side edges are guided through the two uncoated regions that separate the central zone from the two zones positioned laterally thereto.

From the international patent application WO 2011/006743 A1, a heatable windshield is known that has, on a transparent substrate, an electrically conductive coating, two electrical collecting bands, at least one locally limited region demarcated by the coating and, within this region, a coating-free region as a communication window. The demarcated region is at least partially bounded by at least two current collecting regions on the coating running parallel to the equipotential lines and connected via at least one ohmic resistor and at least two electrically isolating separation lines running parallel to electrical field lines.

From the European patent application EP 2 334 141 A1, a coated pane with a heatable communication window is likewise known. At least one heating conductor with two terminals is applied in the coating-free region of the communication window, with the first terminal electrically connected to the electrically conductive transparent coating and the second terminal electrically connected to said coating or to a current collecting band.

Also known from the international patent applications WO 2012/031907 A1 and WO 2012/031908 A1 is a transparent pane with an electrically heatable coating that is electrically connected to at least two first electrodes provided for the electrical connections to the two terminals of a voltage source such that, by applying a supply voltage, a heating current flows via a heating field formed between the two first electrodes. Here, the heating field has at least one coating-free zone as a communication window that is bordered by a zone edge formed at least in sections by the heatable coating. The pane further has a second electrode that is provided for connecting to one terminal of the voltage source. This second electrode has at least one supply section arranged at least in sections in the coating-free zone and one or a plurality of connection sections connected to the supply section. Here, the connection sections extend in each case starting from the coating-free zone beyond an edge section of the zone edge. The edge section is formed by a section of the heating field that is situated between the coating-free zone and the first electrode provided for connecting to the other terminal of the voltage source.

In one embodiment, the supply section consists of at least two supply parts separated from one another that have, in each case, a coupling adapter that is electrically connected to the heatable coating. Here, the two coupling sections are arranged such that they are galvanically coupled by the heatable coating.

The content of the above cited patents is fully incorporated by reference in the present specification.

These known configurations of heatable panes have already brought significant progress. However, the known configurations cannot satisfactorily solve the above-described problems of local overheating in heatable panes that have a particularly large communication window and/or a particularly demanding geometric design of the black edge coating.

In contrast, the object of the present invention consists in improving the known generic panes such that the panes are heatable with an at least virtually uniform heating output distribution and no longer have hotspots caused by new, particularly demanding geometric designs of the black edge coating and/or by particularly large communication windows. These and other objects are accomplished according to the proposal of the invention by a transparent pane with the characteristics of the independent claim.

Advantageous embodiments of the invention are indicated by the characteristics of the subclaims.

In an advantageous embodiment of the pane according to the invention, the surface of the first pane, on which the electrically heatable coating is arranged, is areally bonded to a second pane via a thermoplastic intermediate layer.

In principle, all electrically insulating substrates that are thermally and chemically stable as well as dimensionally stable under the conditions of the production and the use of the pane according to the invention are suitable as the first and, optionally, the second pane.

The first pane and/or the second pane preferably contain glass, particularly preferably flat glass, float glass, quartz glass, borosilicate glass, soda lime glass, or clear plastics, preferably rigid clear plastics, in particular, polyethylene, polypropylene, polycarbonate, polymethyl methacrylate, polystyrene, polyamide, polyester, polyvinyl chloride, and/or mixtures thereof. The first pane and/or the second pane are preferably transparent, in particular, for the use of the pane as a windshield or rear window of a motor vehicle or other uses wherein high light transmittance is desired. In the context of the invention, the term "transparent" is then understood to mean a pane that has transmittance in the visible spectral range of >70%. For panes, which are not in the traffic-relevant field of vision of the driver, for example, for roof panes, the transmittance can, however, also be much less, for example, >5%.

The thickness of the pane according to the invention can vary widely and thus be eminently adapted to the requirements of the individual case. Preferably used are panes with the standard thicknesses of 1.0 mm to 25 mm, preferably of 1.4 mm to 2.5 mm for motor vehicle glass, and preferably from 4 mm to 25 mm for furniture, devices, and buildings, in particular, for electric heaters. The size of the pane can vary widely and is governed by the size of the use according to the invention. The first pane and, optionally, the second pane have, for example, in the automotive industry and in the architectural field, customary areas of 200 cm$^2$ to as much as 20 m$^2$.

The pane according to the invention can have any three-dimensional shape. Preferably, the three-dimensional shape has no shadow zones such that it can, for example, be coated by cathodic sputtering. Preferably, the substrates are planar or slightly or greatly curved in one direction or in multiple spatial directions. In particular, planar substrates are used. The panes can be colorless or colored.

Multiple panes are bonded to one another by at least one intermediate layer. The intermediate layer contains, preferably, at least one thermoplastic plastic, preferably polyvinyl butyral (PVB), ethylene vinyl acetate (EVA), and/or polyethylene terephthalate (PET). However, the thermoplastic intermediate layer can, for example, also contain polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene-propylene, polyvinyl fluoride, and/or ethylene-tetrafluoroethylene, or copolymers or mixtures thereof. The thermoplastic intermediate layer can be formed by one or even by multiple thermoplastic films arranged one over another, with the thickness of a thermoplastic film preferably being from 0.25 mm to 1 mm, typically 0.38 mm or 0.76 mm.

In the case of a composite pane according to the invention comprising a first pane, an intermediate layer, and a second pane, the electrically heatable coating can be applied directly to the first pane or to a carrier film or applied to the intermediate layer itself. The first pane and the second pane have, in each case, an inner surface and an outer surface. The inner surfaces of the first and the second pane face one another and are bonded to one another via the thermoplastic intermediate layer. The outer surfaces of the first and the second pane face away from one another and away from the thermoplastic intermediate layer. The electrically conductive coating is applied to the inner surface of the first pane. Of course, another electrically conductive coating can also be applied to the inner surface of the second pane. The outer surfaces of the panes can also have coatings. The expressions "first pane" and "second pane" are selected to distinguish between the two panes in a composite pane according to the invention. No statement as to the geometric arrangement is associated with the expressions. If the pane according to the invention is intended, for example, in an opening of a motor vehicle or a building, to separate the interior space from the external environment, the first pane can face the interior space or the external environment.

The pane according to the invention comprises an electrically conductive, heatable, transparent coating that extends over at least a substantial part of the area of the pane, in particular, over its field of vision. The electrically heatable coating is electrically connected to at least two, in particular two, collecting electrodes provided for electrical connection to the two terminals of a voltage source such that, by applying a supply voltage, a heating current flows over a heating field formed between the two collecting electrodes. Typically, the two collecting electrodes are, in each case, implemented in the form of a strip-shaped or band-shaped electrode or collecting rail or busbar for the introduction and broad distribution of the current in the heatable coating. For this purpose, they are galvanically connected to the heating layer.

In an advantageous embodiment, the collecting electrode is implemented as a printed and fired conductive structure.

The printed collecting electrode preferably contains at least a metal, a metal alloy, a metal compound, and/or carbon, particularly preferably a noble metal, and, in particular, silver. The printing paste for producing the collecting electrode preferably contains metallic particles, metal particles, and/or carbon, and, in particular, noble metal particles such as silver particles. The electrical conductivity is preferably obtained by means of the electrically conductive particles. The particles can be situated in an organic and/or inorganic matrix such as pastes or inks, preferably as a printing paste with glass frits.

The layer thickness of the printed collecting electrode is preferably from 5 μm to 40 μm, particularly preferably from 8 μm to 20 μm, and most particularly preferably from 8 μm to 12 μm. Printed collecting electrodes with these thicknesses are technically simple to realize and have an advantageous current carrying capacity.

The specific resistance $\rho_a$ of the collecting electrode is preferably from 0.8 μohm·cm to 7.0 μohm·cm and particularly preferably from 1.0 μohm·cm to 2.5 μohm·cm. Collecting electrodes with specific resistances in this range are technically simple to realize and have an advantageous current carrying capacity.

However, alternatively, the collecting electrode can also be implemented as a strip of an electrically conductive film. The collecting electrode then contains, for example, at least aluminum, copper, tinned copper, gold, silver, zinc, tungsten, and/or tin or alloys thereof. The strip preferably has a thickness from 10 μm to 500 μm, particularly preferably from 30 μm to 300 μm. Collecting electrodes made of electrically conductive films with these thicknesses are technically simple to realize and have an advantageous current carrying capacity. The strip can be electrically conductively connected to the electrically conductive structure, for example, via a solder compound, via an electrically conductive adhesive, or by direct placement.

The electrically conductive, heatable coating of the pane according to the invention can be subdivided into a heating field, i.e., the heatable part of the electrically heatable coating, which is situated between the two collecting electrodes such that a heating current can be introduced, and a region outside said heating field.

Electrically heatable coatings are known, for example, from DE 20 2008 017 611 U1, EP 0 847 965 B1, or WO2012/052315 A1. They typically include one or more, for example, two, three, or four electrically conductive functional layers. The functional layers preferably contain at least a metal, for example, silver, gold, copper, nickel and/or chromium, or a metal alloy. The functional layers particularly preferably contain at least 90 wt.-% of the metal, in particular, at least 99.9 wt.-% of the metal. The functional layers can be made of the metal or the metal alloy. The functional layers particularly preferably contain silver or a silver-containing alloy. Such functional layers have a particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the spectral range and particularly advantageous electrical conductivity are obtained.

Typically, at least one dielectric layer is arranged, in each case, between two adjacent functional layers of the heatable coating. Preferably, another dielectric layer is arranged below the first and/or above the last functional layer. A dielectric layer contains at least one individual layer made of a dielectric material, for example, containing a nitride such as silicon nitride or an oxide such as aluminum oxide. The dielectric layer can, however, also include multiple individual layers, for example, individual layers of a dielectric material, smoothing layers, matching layers, blocker layers, and/or anti-reflection layers. The thickness of a dielectric layer is, for example, from 10 nm to 200 nm.

This layer structure is generally obtained through a sequence of deposition procedures that are performed using a vacuum method such as magnetically enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

The heatable coating can, in principle, be any coating that is to be electrically contacted. If the pane according to the invention is intended to enable vision through it, as is the case, for example, with panes in the window area, the electrically conductive coating is preferably transparent. The heatable coating is, preferably, transparent to electromagnetic radiation, particularly preferably to electromagnetic radiation of a wavelength of 300 to 1300 nm, and, in particular, to visible light.

In an advantageous embodiment, the heatable coating is a layer or a layer structure of a plurality of individual layers with a total thickness less than or equal to 2 μm, particularly preferably less than or equal to 1 μm.

An advantageous heatable coating has a sheet resistance from 0.4Ω/□ to 10Ω/□. In a particularly preferred embodiment, the electrically conductive coating according to the invention has a sheet resistance from 0.5Ω/□ to 1Ω/□. Coatings with such sheet resistances are particularly well-suited for the heating of motor vehicle window panes with typical onboard voltages from 12 V to 48 volts or in electric motor vehicles with typical onboard voltages of as much as 500 V.

The heatable layer can extend over the entire surface of the first pane. Alternatively, however, the heatable layer can also extend over only part of the surface of the first pane. The heatable layer preferably extends over at least 50%, particularly preferably over at least 70%, and most particularly preferably over at least 90% of the inner surface of the first pane.

In an advantageous embodiment of a pane according to the invention as a composite pane, the inner surface of the first pane has a circumferential edge region with a width from 2 mm to 50 mm, preferably from 5 mm to 20 mm, that is not provided with the electrically conductive coating. Then, the electrically conductive coating has no contact with the atmosphere and is, in the interior of the pane, advantageously protected by the thermoplastic intermediate layer against damage and corrosion.

In the pane according to the invention, the heating field includes at least one coating-free zone in which no heatable coating is present. The coating-free zone is bounded by a zone edge formed at least in sections by the heatable coating.

In particular, the coating-free zone has a circumferential zone edge that is completely formed by the heatable coating.

However, the zone edge can transition into the circumferential coating edge of the heatable coating such that the coating-free zone is connected directly to the coating-free edge strip surrounding the pane edge of the pane according to the invention.

The coating-free zone can have quite varied contours. Thus, the contour can be square, rectangular, trapezoidal, triangular, pentagonal, hexagonal, heptagonal, or octagonal with rounded corners and/or curved edges as well as being circular, oval, drop-shaped, or elliptical. The contour lines can have a rectilinear, wavy, zigzag, and/or a saw-tooth course. A plurality of these geometric characteristics can be implemented in one and the same coating-free zone.

In particular, the coating-free zone serves as a communication window that is permeable to electromagnetic radiation, in particular, IR radiation, radar radiation, and/or radio radiation. In addition, sensors, for example, rain sensors, can also be placed in the communication window.

The coating-free zone can be produced, for example, by masking at the time of application of the heating layer onto a substrate or by removal of the heating layer, for example, by mechanical or chemical ablation and/or by ablation by means of irradiation with electromagnetic radiation, in particular, laser light radiation, after application of the electrically heatable coating.

According to the proposal of the invention, the transparent pane is substantially distinguished in that it has at least one, in particular one, additional electrode or third busbar provided for electrical connection to one terminal of the voltage source that is arranged, at least in sections, in particular, only with one electrode section, in the coating-free zone and is electrically connected to the electrically heatable coating such that by application of a feed voltage, a part of the heating current flows via a heating field section of the heating field that is situated between the additional electrode or the coating-free zone and the collecting electrode provided for connection to the other terminal of the voltage source.

Preferably, at least one of the additional electrodes or the one additional electrode can be subdivided into at least two, in particular two, subregions separated from one another.

Preferably, the at least one additional electrode extends, or the at least two subregions of the additional electrode separated from one another extend, along the lower zone edge of the at least one coating-free zone, in the installed state of the pane according to the invention. "Along" means that the additional electrode or its subregions run nearly parallel or exactly parallel to the lower zone edge.

If the additional electrode or its at least two subregions separated from one another is arranged in the coating-free zone such that the area between the zone edge of the heating field and the additional electrode or its subregions is still coating-free, the electrical connection of the additional electrode to the heating field section is accomplished using at least two, preferably at least three, more preferably at least four, and, in particular at least five, connection sections. If the additional electrode is subdivided into at least two, in particular two, subregions separated from one another, at least one subregion has or, in particular all subregions have at least two, preferably at least three, more preferably at least four, and, in particular, at least five connection sections.

The connection sections can have the form of straight or curved strips whose length is greater than their width.

However, the connection sections can also be formed by bulges and/or protrusions of the additional electrode or its subregions if it/they, for example, runs/run in the shape of a wave, a zigzag, saw teeth, or a meander such that they touch the heating field in sections.

The connection sections extend from the additional electrode or its subregions separated from one another into the heating field section of the heating field between the additional electrode or its subregions and the electrically charged collecting electrode opposite thereto, in particular, the lower collecting electrode in the installed state of the pane according to the invention.

Preferably, the electrical connection of the additional electrode or the at least two subregions of the additional electrode separated from one another to one terminal of the voltage source is made via one of the two collecting electrodes, in particular, via the upper collecting electrode in the installed state of the pane according to the invention.

According to the invention, at least one, in particular one, of the two collecting electrodes is subdivided into at least two, in particular two, subregions separated from one another.

From each of the at least two, in particular two, subregions of the respective collecting electrode, at least one, in particular one, electrical supply line leads, in each case, to the at least one, in particular one, additional electrode.

However, each of the at least two, in particular two, subregions separated from one another of the at least one, in particular one, collecting electrode can be electrically connected via at least one, in particular one, electrical supply line to, in each case, at least one, in particular one, subregion of the additional electrode. In this case, the galvanic connection or coupling between the subregions of the additional electrode is made via the heating field section of the heating field between the additional electrode or its subregions and the opposing electrically charged collecting electrode, in particular, the lower collecting electrode in the installed state of the pane according to the invention.

According to the invention, at least one electrical supply line is and, in particular all electrical supply lines are arranged at least in sections in the at least one coating-free zone,
  in the coating-free edge strip, in particular in the coating-free edge strip that is directly adjacent the collecting electrode,
  in at least one subregion, in particular in at least two subregions, of the electrically heatable coating outside the heating field, in particular the subregions that are directly adjacent the collecting electrodes, and/or
  at and/or in the zone edge of the at least one coating-free zone formed by the heatable coating.

Preferably, at least one of the electrical supply lines is or, in particular, all electrical supply lines are arranged predominantly or entirely in the coating-free edge strip and/or the at least one coating-free zone.

"Predominantly" means that the electrical supply lines run only a short distance, preferably only for a distance of 5 to <50%, particularly preferably 5 to 40%, and in particular 5 to 30% of their entire length, on or in the subregions of the coating outside the heating field.

Preferably, the electrical supply lines run in sections through the upper region of the coating-free zone in the installed state of the pane according to the invention or if at least one other coating-free zone is arranged near, in particular above, the first coating-free zone, through this other coating-free zone.

Particularly preferably, the electrical supply lines run in sections through the upper region of the coating-free zone that connects directly to the circumferential coating-free edge strip.

Preferably, in addition, the at least two electrical supply lines extend in sections along the lateral zone edges of the at least one coating-free zone in the installed state of the transparent pane, where "along" has the meaning indicated above. In particular, the at least two electrical supply lines have along these distances no electrical contact with the zone edge of the coating, in particular with the zone edge formed by the heating field.

The length of the electrical supply lines can vary broadly and, consequently, be eminently adapted to the requirements of the individual case.

Likewise, the width of the electrical supply lines can vary broadly and also be eminently adapted to the requirements of the individual case.

The electrical supply lines can run in sections in a straight line, in a curve, in a wave shape, in a zigzag shape, and/or in a meander.

According to the invention, the length and the width as well as the shape, in particular the length and the width, of the electrical supply lines, is selected in the individual case such that the additional electrode or its subregions has/have a voltage such that a temperature is established in the regions of the heating field and the heating field section adjacent them and the coating-free zone that deviates only slightly, preferably only 5 to 50° C., in particular only 5 to 40° C., and, ideally, not at all, from the temperature of the rest of heated coating.

More precisely stated, on the one hand, by means of the length of the additional electrode, the electrical potential, in particular, at the connection point to the heating field is established such that the most possible current flows via the additional electrode. On the other hand, only so much current can be allowed to flow that the additional electrode and its direct surroundings do not overheat, in order to prevent the formation of hotspots. Thus, theoretically, the electrical potential or the electrical resistance of the additional electrode could accordingly be adapted only by its width. However, in this case, the problem would arise that the entire voltage drop would have to be relieved over only a very short additional electrode, which itself would lead to overheating of the additional electrode. This problem can, however, be solved according to the invention by means of the longest possible electrical supply lines, which prevent overheating.

Preferably, the electrical supply lines are made of the same electrically conductive materials as the collecting electrodes.

Overall, a virtually homogeneous distribution of the heating power is effected by the arrangement according to the invention of collecting electrode, additional electrode, electrical supply lines, and coating-free lines; and the formation of spots with reduced or elevated heating power (hotspots) is effectively prevented.

Thus, the formation of residues of ice and/or condensed water can also be effectively prevented by means of the arrangement according to the invention in the region of the coating-free zone of the pane according to the invention.

The collecting electrodes are electrically contacted by one or a plurality of feed lines. The feed line is preferably implemented as a flexible foil conductor or flat conductor or ribbon cable. This is understood to mean an electrical conductor whose width is clearly greater than its thickness. Such a flat conductor is, for example, a strip or tape, containing or made of copper, tinned copper, aluminum, silver, gold, or alloys thereof. The flat conductor has, for example, a width of 2 mm to 16 mm and a thickness of 0.03 mm to 0.1 mm. The flat conductor can have an insulating, preferably polymeric sheath, based, for example, on polyimide. Flat conductors that are suitable for the contacting of electrically conductive coatings in panes have a total thickness of, for example, only 0.3 mm. Such thin flat conductors can be embedded without difficulty in the thermoplastic intermediate layer between the individual panes. A plurality of conductive layers isolated from one another can be situated in a ribbon cable.

Alternatively, thin metal wires can also be used as electrical feed lines. The metal wires contain, in particular, copper, tungsten, gold, silver, or aluminum or alloys of at least two of these metals. The alloys can also contain molybdenum, rhenium, osmium, iridium, palladium, or platinum.

In the pane according to the invention, the at least two subregions of the at least one collecting electrode are electrically conductively connected via at least one electrically conductive connecting part to at least one flat conductor connected to a voltage source.

The at least one flat conductor and the at least one connecting part are arranged electrically isolated from the at least two electrical supply lines.

The flat conductor can be connected to the connecting part by a flat metal strip, in particular, a copper strip.

The electrical isolation can be accomplished by spatial separation, by associating a flat conductor connected to a common voltage source with each subregion of the at least one collecting electrode.

In one embodiment of the pane according to the invention, two subregions of the at least one collecting electrode can, however, be electrically conductively connected via a common connecting part to only one flat conductor. In this case, the electrical isolation between the flat conductor and the connecting part on the one hand and the at least two electrical supply lines on the other is implemented by means of an electrically insulating layer, in particular, by means of a strip-shaped, electrically insulating layer, between the flat conductor and the connecting part on the one hand and the at least two electrical supply lines on the other. The electrically insulating layer, in particular, the strip-shaped, electrically insulating layer, covers at least the points of intersection of the connecting part with the at least two electrical supply lines.

Preferably, this arrangement has, overall, a layered structure composed of the following superimposed layers:
  a pane,
  sections of the electrical supply lines covered by the insulation,
  the subregions of the coating adjacent the electrical supply lines outside the heating field, on whose zone edges the opposing edges of the electrically insulating layer abut;
  a flat conductor resting on the electrically insulating layer, subregions of the collecting electrode, as well as
  the connecting part electrically connected thereto.

A substantial advantage of this arrangement is that now only one flat conductor is required for supplying two subregions of one collecting electrode, which substantially simplifies the production of the pane according to the invention.

In a preferred embodiment of the pane according to the invention, the regions in which the collecting electrodes, the flat conductor(s), the additional electrode(s), the electrical supply lines as well as the coating-free zones are arranged are partially or completely optically masked by conventional and known opaque or nontransparent masking strips. Preferably, the masking strips are colored black. Preferably, the precursors of the masking strips are applied by screen printing on the as yet uncoated panes, after which the applied layers are fired.

The panes according to the invention can be produced in a conventional and known manner. Preferably, they are produced using the method according to the invention.

The method according to the invention comprises the following process steps:
(A) Producing an electrically heatable coating,
(B) Producing at least one coating-free zone in the coating and in the heating field, (C) Forming at least two collecting electrodes provided with the two terminals of a voltage source, which are electrically connected to the electrically heatable coating such that by applying a supply voltage, a heating current flows via a heating field situated between the two collecting electrodes, wherein at least one of the two collecting electrodes is implemented subdivided into at least two subregions separated from one another, (D) Producing at least one additional electrode provided for electrically connecting to at least one of the two collecting electrodes and/or at least two subregions, separated from one another, of the at least one additional electrode, and (E) Producing at least two electrical supply lines which connect the at least one additional electrode and/or, in each case, one of its at least two subregions electrically to, in each case, at least one of the at least two subregions, separated from one another, of at least one of the collecting electrodes, wherein at least one of the at least two electrical supply lines is produced running, at least in sections, In the at least one coating-free zone and/or in the coating-free edge strip and/or in at least one subregion of the coating outside the heating field and/or at and/or in the zone edge, formed by the coating, of the at least one coating-free zone.

In a particularly preferred embodiment of the method according to the invention, the process steps (C), (D), and (E) are performed simultaneously. Preferably, a screen printing method is used here.

Specifically, the application of the electrically conductive, heatable coating in process step (A) can be done by methods known per se, preferably by magnetic-field enhanced cathodic sputtering. This is particularly advantageous with regard to simple, quick, economical, and uniform coating of the first pane, when the pane according to the invention is designed as a composite pane. However, the electrically conductive, heatable coating can also be applied, for example, by vapor deposition, chemical vapor deposition (CVD), plasma enhanced chemical vapor deposition (PECVD), or by wet chemical methods.

The first pane can be subjected, after process step (A), to a temperature treatment. Here, the first pane with the electrically conductive, heatable coating is heated to a temperature of at least 200° C. preferably at least 300° C. The temperature treatment can serve to increase transmittance and/or to reduce the sheet resistance of the electrically conductive coating.

The first pane can be bent after process step (A), typically at a temperature from 500° C. to 700° C. Since it is technically simpler to coat a flat pane, this procedure is advantageous if the first pane is to be bent. However, alternatively, the first pane can also be bent before process step (A), for example, if the electrically conductive coating is unsuitable to withstand a bending process without damage.

The application of the collecting electrodes in process step (C) and the electrical supply lines in process step (E) is preferably done by printing and firing an electrically conductive paste in a screen print method or in an inkjet method. Alternatively, the collecting electrodes and the electrical supply lines can be applied as strips of an electrically conductive foil on the electrically conductive, heatable coating, preferably placed, soldered, or glued.

In screen printing methods, the lateral shaping is done by masking the mesh through which the printing paste with the metal particles is pressed. By means of suitable shaping of the masking, it is possible, for example, in a particularly simple manner, to predefine and vary the width of the collecting electrode.

The coating-free zones are produced in process step (B), preferably by mechanical ablation of the heatable coating produced in process step (A). The mechanical ablation can also be replaced or supplemented by treatment with suitable chemicals and/or by irradiation with electromagnetic radiation.

An advantageous improvement of the method according to the invention includes at least the following additional steps:

Arranging a thermoplastic intermediate layer on the coated surface of the first pane and arranging a second pane on the thermoplastic intermediate layer, and Bonding the first pane and the second pane via the thermoplastic intermediate layer.

In these process steps, the first pane is arranged such that the one of its surfaces that is provided with the heatable coating faces the thermoplastic intermediate layer. The surface thus becomes the inner surface of the first pane.

The thermoplastic intermediate layer can be formed by a single thermoplastic film or by two or more thermoplastic films arranged areally one over another.

The bonding of the first and second pane is preferably done under the action of heat, vacuum, and/or pressure. Methods known per se for producing a pane can also be used.

For example, so-called "autoclave methods" can be performed at an elevated pressure of roughly 10 bar to 15 bar and temperatures from 130° C. to 145° C. for roughly 2 hours. Vacuum bag or vacuum ring methods known per se operate, for example, at roughly 200 mbar and 80° C. to 110° C. The first pane, the thermoplastic intermediate layer, and the second pane can also be pressed in a calendar between at least one pair of rollers to form a pane. Systems of this type for producing panes are known and normally have at least one heating tunnel upstream from a pressing unit. The temperature during the pressing operation is, for example, from 40° C. to 150° C. Combinations of calendar and autoclave methods have proved particularly valuable in practice. Alternatively, vacuum laminators can be used. These consist of one or a plurality of heatable and evacuable chambers, in which the first pane and the second pane are laminated within, for example, roughly 60 minutes at reduced pressures from 0.01 mbar to 800 mbar and temperatures from 80° C. to 170° C.

The pane according to the invention, in particular the pane according to the invention produced using the method according to the invention, can ideally be used as a functional and/or decorative individual piece and/or as a built-in component in furniture, devices, and buildings as well as in means of transportation for transportation on land, in the air, or on water, in particular, in motor vehicles, for example, as a windshield, rear window, side window, and/or glass roof. Preferably, the pane according to the invention is implemented as a vehicle windshield or vehicle side window.

It is understood that the characteristics mentioned above and explained in detail in the following can be used not only in the combinations and configurations indicated, but also in other combinations and configurations or alone without departing from the scope of the present invention.

BRIEF DESCRIPTION OF THE DRAWINGS

The invention is now explained in detail using exemplary embodiments with reference to the accompanying figures. They depict, in simplified, not to scale representation.

In the FIGS. 1 to 7, the reference characters have the following meaning:

1 windshield
2 outer pane
3 inner pane
4 adhesive layer
5 pane edge
6, 6' first side
7, 7' second side
8 coating
8', 8" subregion of the coating 8 outside the heating field 12
9 coating-free edge strip
10 coating edge
11, 11'" collecting electrode
11', 11" subregion of the collecting electrode 11
12 heating field between the collecting electrodes 11 and 11'"
13, 13' masking strip
13" edge of the masking strip
14 coating-free zone
14' upper region of the coating-free zone 14 in the installed state of the windshield 1
14" lower region of the coating-free zone 14 in the installed state of the windshield 1
15 additional electrode
15', 15" subregion of the additional electrode 15
16, 16' electrical supply line
17 zone edge, formed by the electrically conductive coating 8, of the first coating-free zone 14
17', 17" lateral zone edge of the coating-free zone 14, in the installed state of the windshield 1
17'" lower zone edge of the coating-free zone 14, in the installed state of the windshield 1
17"" upper zone edge of the coating-free zone 14, in the installed state of the windshield 1
18, 18' flat conductor to one terminal of a voltage source
19, 19' copper connection between flat conductors 18, 18' and connecting part 20,
20' to the collecting electrode 11, 11'
20, 20' connecting part between flat conductor 18 or copper connection 19, 19' and the subregions 11' and 11" of collecting electrode 11
21, 21' connection section
22 heating field section of the heating field 12 between additional electrode 15 or its subregions 15' and 15" and collecting electrode 11'"
23 electrically insulating layer

DETAILED DESCRIPTION OF THE DRAWINGS

FIG. 1

Figure 1:
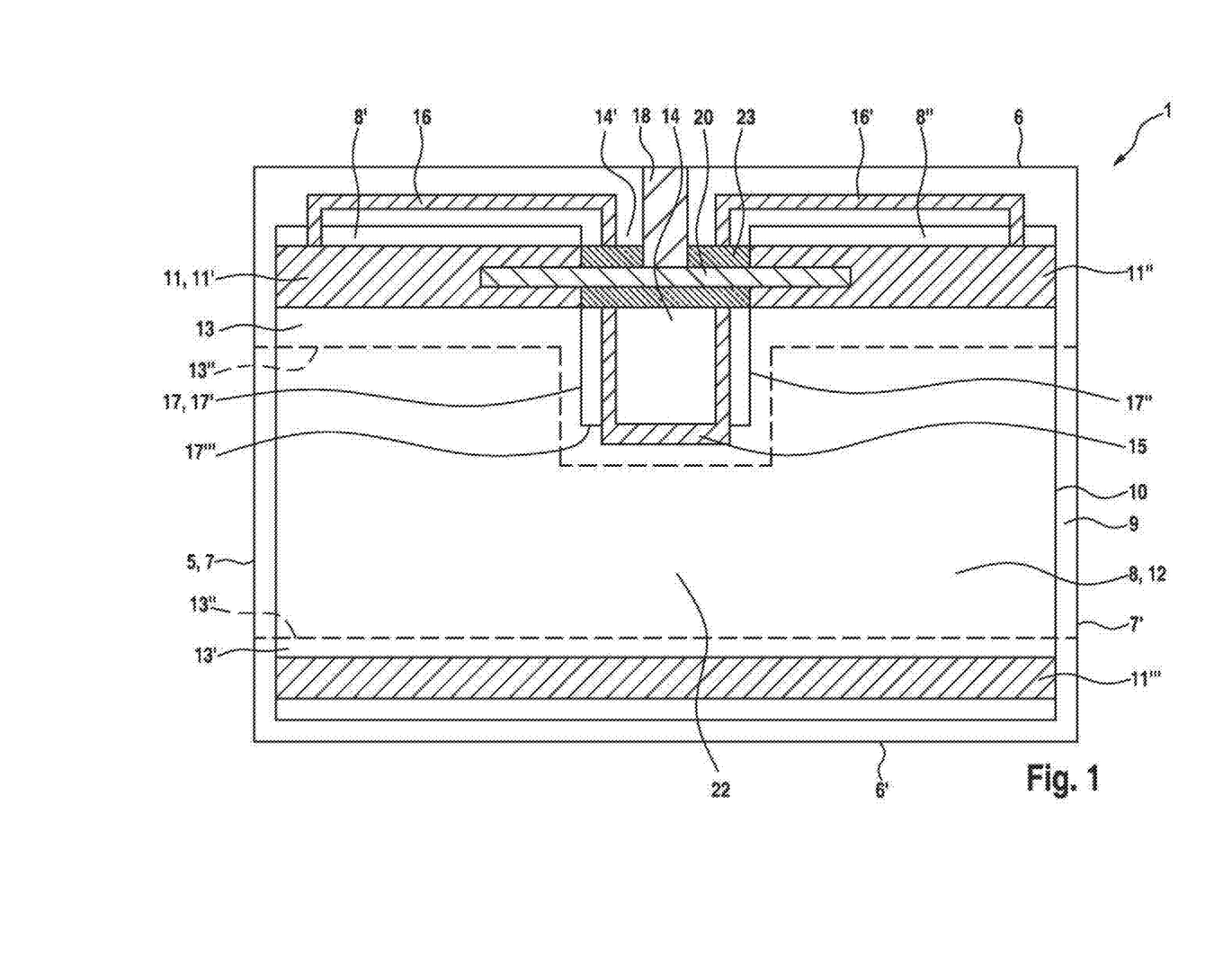
FIG. 1 a plan view of an exemplary embodiment of the windshield according to the invention.

FIG. 1 depicts a transparent windshield 1 of a motor vehicle viewed from the inside. Here, the windshield 1 is implemented, for example, as a laminated glass pane whose structure is illustrated using the representation of a vertical cut through a detail of the windshield 1 in FIG. 5 and using the perspective sectional view of a detail of the windshield 1 in FIG. 6.

Figure 5:
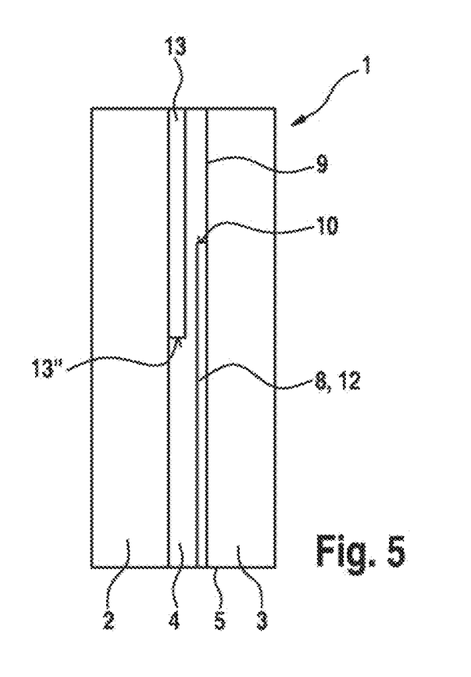
FIG. 5 a representation of a vertical cut through a detail of the windshield according to the invention of FIG. 1 through 4.
Figure 6:
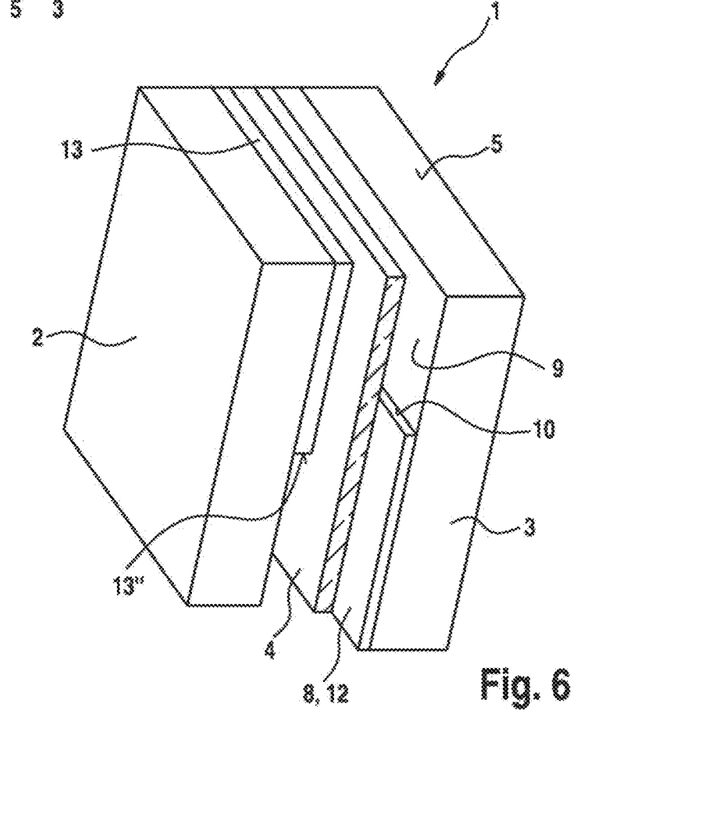
FIG. 6 a perspective cross-sectional view of a detail of the windshield of FIG. 1 through 4.

Accordingly, the windshield 1 comprises two rigid individual panes, namely an outer pane 2 and an inner pane 3, which are adhesively bonded to each other by a thermoplastic adhesive layer 4, here, for example, a polyvinyl butyral film (PVB), an ethylene vinyl acetate film (EVA), or a polyurethane film (PU). The two individual panes 2, 3 are roughly the same size and shape and can, for example, have a trapezoidal curved outline, which is not shown in detail in the figures. They are made, for example, of glass, being also possibly made of a nonglass material such as plastic. For applications other than windshields, it would also be possible to produce the two individual panes 2, 3 from a flexible material. The outline of the windshield 1 is defined by a pane edge 5 common to the two individual panes 2, 3, with the windshield 1 having, at the top and bottom, two opposing first sides 6, 6' as well as, on the left and on the right, two opposing second sides 7, 7'.

As depicted in FIGS. 5 and 6, a transparent, electrically heatable coating 8 is deposited on the side of the inner pane 3 bonded to the adhesive layer 4. Here, the heatable coating 8 is, for example, applied substantially on the entire surface of the inner pane 3, with an edge strip 9 of the inner pane 3 circumferential on all sides not coated such that a coating edge 10 of the electrically conductive coating 8 is set back inward relative to the pane edge 5. This effects electrical isolation of the electrically conductive coating 8 toward the outside. In addition, the electrically conductive coating 8 is protected against corrosion penetrating from the pane edge 5.

The heatable coating 8 comprises, in a manner known per se, a layer sequence (not shown) with at least one electrically heatable, metallic sublayer, preferably silver, and, optionally, other sublayers such as anti-reflection layers and blocker layers. The layer sequence advantageously has high thermal stability such that it withstands, without damage, the temperatures of typically more than 600° C. necessary for bending glass panes; however, layer sequences with low thermal stability can also be provided. The heatable coating 8 can also be applied as a metallic single layer. It is also conceivable not to apply the electrically conductive coating 8 directly on the inner pane 3, but instead to apply it first on a carrier, for example, a plastic film that is subsequently bonded with the outer and inner pane 2, 3. Alternatively, the carrier film can be bonded to adhesive films (e.g., PVB films) and bonded as a three layer arrangement (trilayer) to inner and outer pane 2, 3. The heatable coating 8 is preferably applied by sputtering or magnetron cathodic sputtering onto the inner or outer pane 2, 3.

As depicted in FIG. 1, the heatable coating 8 is electrically conductively connected adjacent the first sides 6, 6', i.e., at the upper and lower pane edge 5, to a band-shaped upper collecting electrode or busbar 11 and a band-shaped lower collecting electrode 11' and, for example, for this purpose, galvanically coupled to the two collecting electrodes 11, 11'. The upper collecting electrode 11 is provided for connecting to one terminal of a voltage source (not shown). The two collecting electrodes 11, 11' of opposite polarity serve for uniform introduction and distribution of the heating current in the heating field 12 of the heatable coating 8, situated therebetween. The two collecting electrodes 11, 11' are, for example, printed onto the electrically heatable coating 8 and have, in each case, an at least approx. rectilinear course.

According to the invention, the upper collecting electrode 11 is subdivided into two subregions 11" and 11''' separated from one another.

From each of the two subregions 11", 11''', in each case, an electrical supply line 16, 16' runs to an additional electrode 15. The electrical supply lines 16, 16' run a short distance through the subregions 8', 8" laid outside the heating layer 12 above the two subregions 11' and 11". Thereafter, the electrical supply lines 16, 16' run a longer distance through the coating-free edge strip 9 adjacent the upper side 6 of the windshield 1 all the way to the upper region 14' of the coating-free zone 14. From there, the two electrical supply lines 16, 16' run within the coating-free zone 14 along the lateral zone edges 17', 17" formed by the heatable coating 8 to the additional electrode 15, which is arranged on the lower zone edge 17''' of the coating-free zone 14 such that it is galvanically coupled to the heating field section 22 of the heating field 12 between the additional electrode 15 and the lower collecting electrode 11'''.

The coating-free zone has here, for example, an at least approx. rectangular contour. It is bordered by the zone edges 17', 17", and 17'''. In its upper region 14', it transitions into the coating-free edge region 9. It is transparent at least to a part of the electromagnetic spectrum (e.g., IR radiation, radio waves in the ultrashort, short, and longwave range), to enable unobstructed data traffic through the windshield 1. The coating-free zone 14 can be produced, for example, by prior masking at the time of the application of the heatable coating 8 on the inner pane 3. Alternatively, it can also be produced after application of the heatable coating 8 by chemical and/or mechanical ablation, for example, by etching or use of a friction wheel. It is situated within the heating field 12 in the vicinity of the subregions 11', 11" of the upper collecting electrode 11.

The subregions 11', 11", the lower collecting electrode 11''', the additional electrode 15, and the electrical supply lines 16, 16' can be produced by printing, for example, using a screen printing method, a metallic printing paste, for example, silver printing paste, onto the subregions 8', 8" of the heatable coating 8, the coating-free edge strip 9, and the coating-free zones 14, 14', preferably in one process step.

The electrical connection of the two subregions 11', 11" to a terminal of the voltage source (not shown) is made via an electrically conductive, metallic connecting part 20, which connects the two subregions 11', 11" to a conventional and known flat conductor 18. The arrangement comprising the flat conductor 18 and connecting part 20 is electrically isolated by a strip-shaped, electrically insulating layer 23 from the sections of the electrical supply lines 16, 16' running thereunder. The strip-shaped, electrically insulating layer 23 runs between the two subregions 11', 11" and abuts their end edges.

Figure 7:
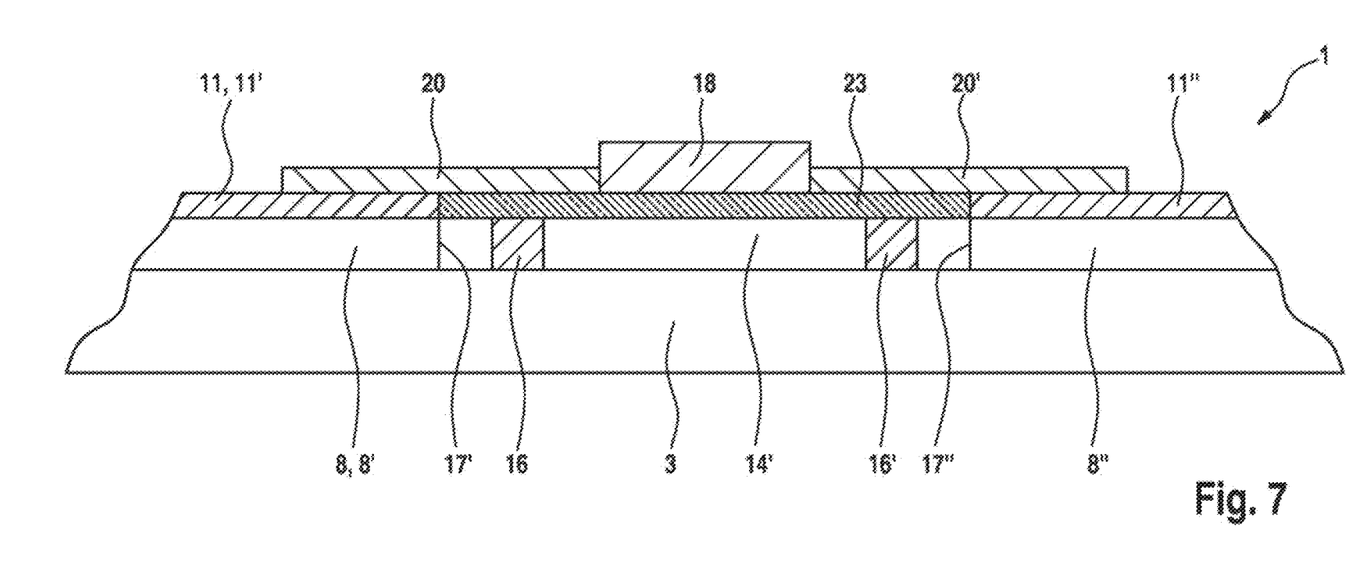
FIG. 7 a representation of a vertical cut through a detail of the windshield according to the invention of FIG. 1.

This arrangement is again further illustrated with reference to FIG. 7. FIG. 7 depicts a vertical section through the arrangement comprising inner pane 3, subregions 8, 8', 8" with the zone edges 17', 17", subregions 11', 11", strip-shaped, electrically insulating layer 23, flat conductor 18 lying thereon, and adjacent subregions 20, 20' of the connecting part 20.

In another embodiment, the strip-shaped, electrically insulating layer 23 does not abut the end edges of the subregions 11', 11", but, instead, covers only the intersections of the electrical supply lines 16, 16' with the connecting parts 20, 20'.

The regions of the windshield 1 in which the above-described functional elements are situated as well as parts of the heating field 12 are concealed by black, opaque masking strips 13, 13' with the edges 13" and thus visually masked. The masking strips also serve for shielding against UV radiation, which could compromise the functions of the electrically conductive elements.

FIG. 2

Figure 2:
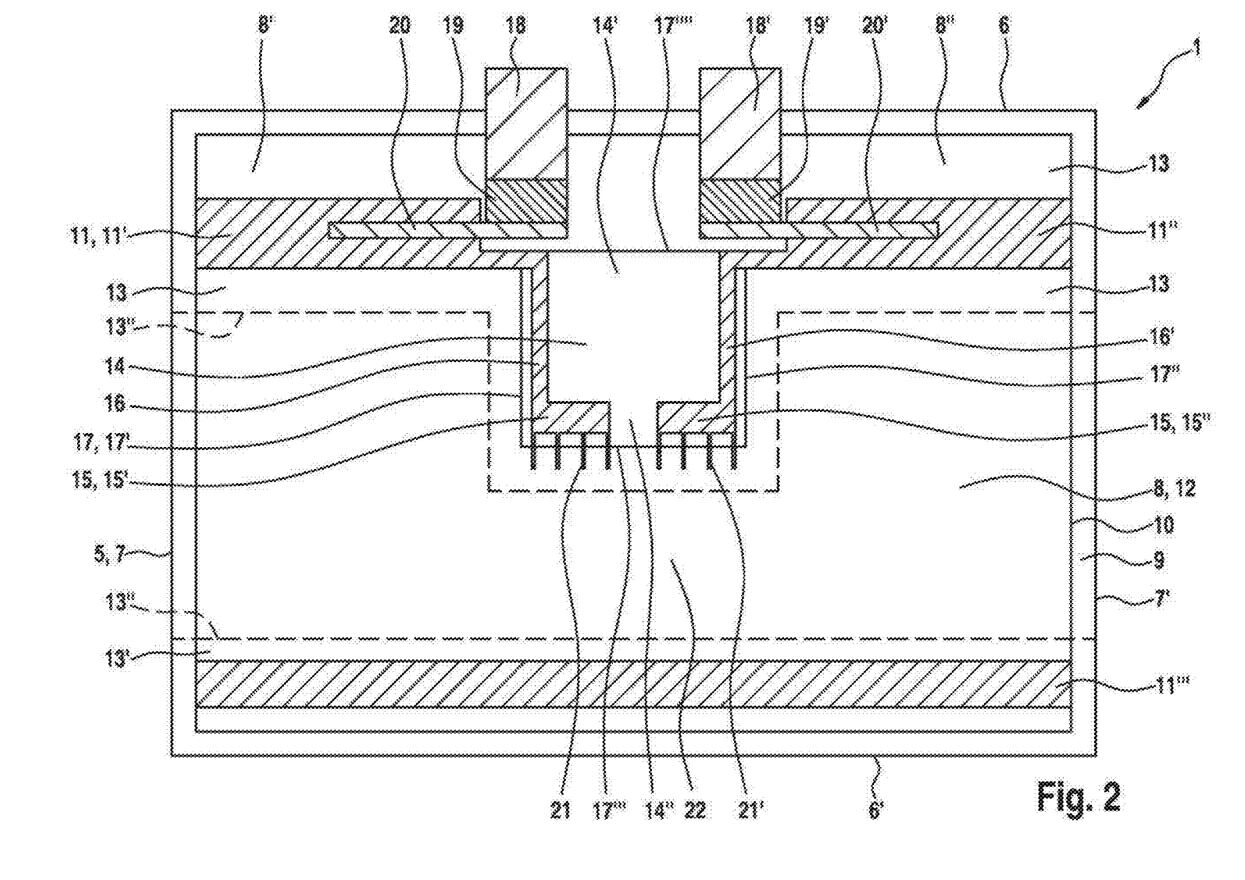
FIG. 2 a plan view of another exemplary embodiment of the windshield according to the invention.

FIG. 2 depicts a plan view of another embodiment of the windshield 1 according to the invention.

The embodiment of FIG. 2 resembles the embodiment of FIG. 1 with the following significant differences:

Each of the two subregions 11', 11" is connected via, in each case, an electrically conductive connecting part 20, 20' and flat, strip-shaped connections made of copper 19, 19' to, in each case, a flat conductor 18, 18'. The two flat conductors 18, 18' are connected to a terminal of a voltage source. The connecting parts 20, 20' and two flat conductors 18, 18' run, in sections, on the subregions 8', 8" of the heatable coating 8. The two strip-shaped connections 19, 19' are arranged entirely in the subregions 8', 8".

From each of the two subregions 11', 11", in each case, an electrical supply line 16, 16' runs for a short distance over the heatable coating 8 in the coating-free zone 14. Within the coating-free zone 14, each of the two electrical supply lines 16, 16' runs along the lateral zone edges 17', 17" to, in each case, a subregion 15, 15' of the additional electrode 15. These subregions 15', 15" run within the lower region of coating-free zone 14" along the lower zone edge 17"'.

Each of the two subregions 15', 15" is galvanically coupled via a plurality of narrow strip-shaped connection sections 21, 21' to the heating field section 22 of the heating field 12 such that the heating current can be precisely guided into the adjacent regions.

FIG. 3

Figure 3:
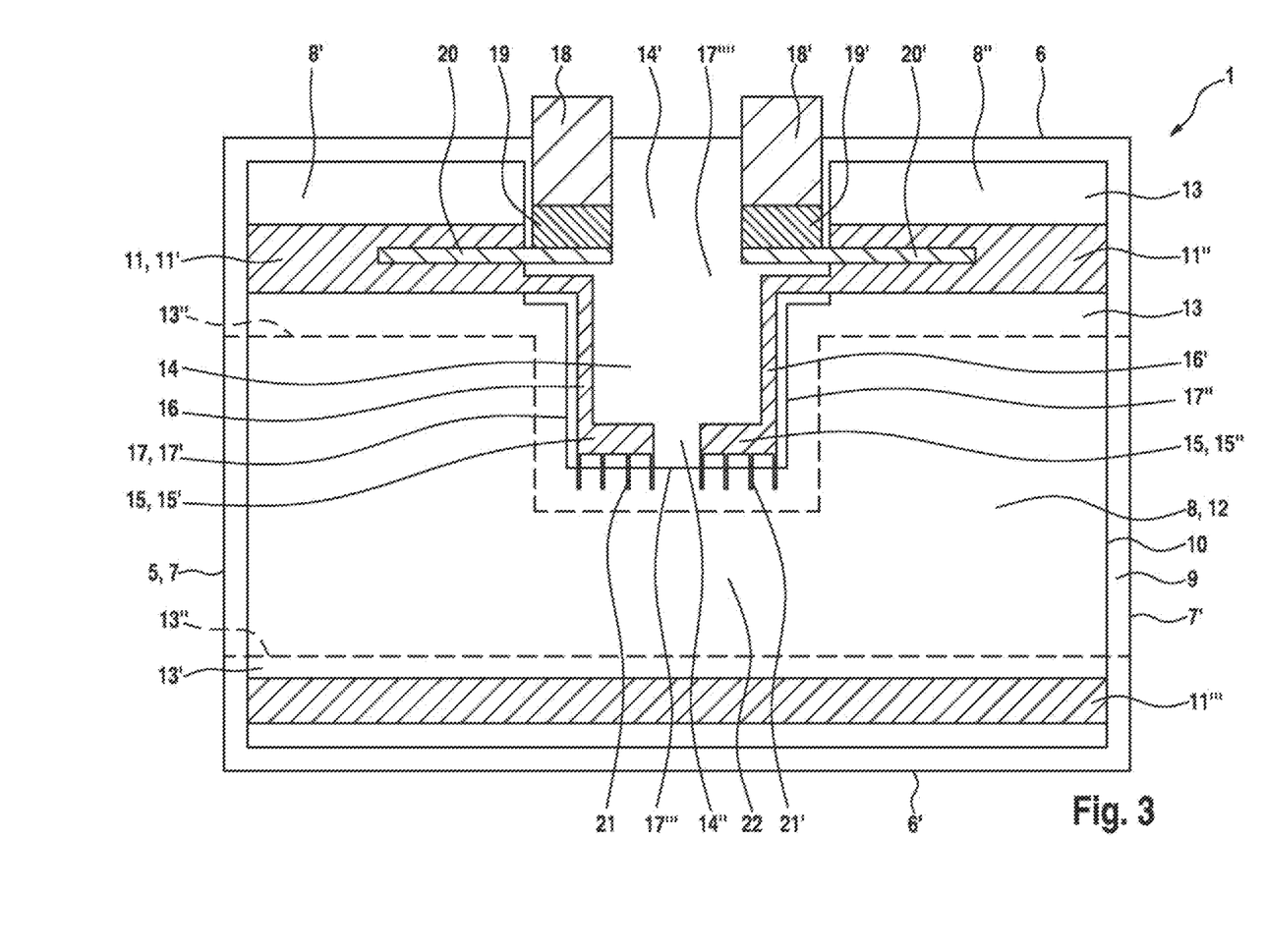
FIG. 3 a plan view of another exemplary embodiment of the windshield according to the invention.

The embodiment of FIG. 3 substantially resembles the embodiment of FIG. 2 with the significant difference that the two electrical supply lines 16, 16' run directly from the side edges of the subregions 11', 11" into the upper region 14' of the coating-free zone 14. Here, the upper region 14' transitions into the coating-free edge strip 9 situated on the first side 6, or the relevant section of the coating-free edge strip 9 is an integral component of the upper region 14'. The advantage of this embodiment of FIG. 3 is that the electrical supply lines 16, 16' have no contact with the heatable coating 8.

FIG. 4

Figure 4:
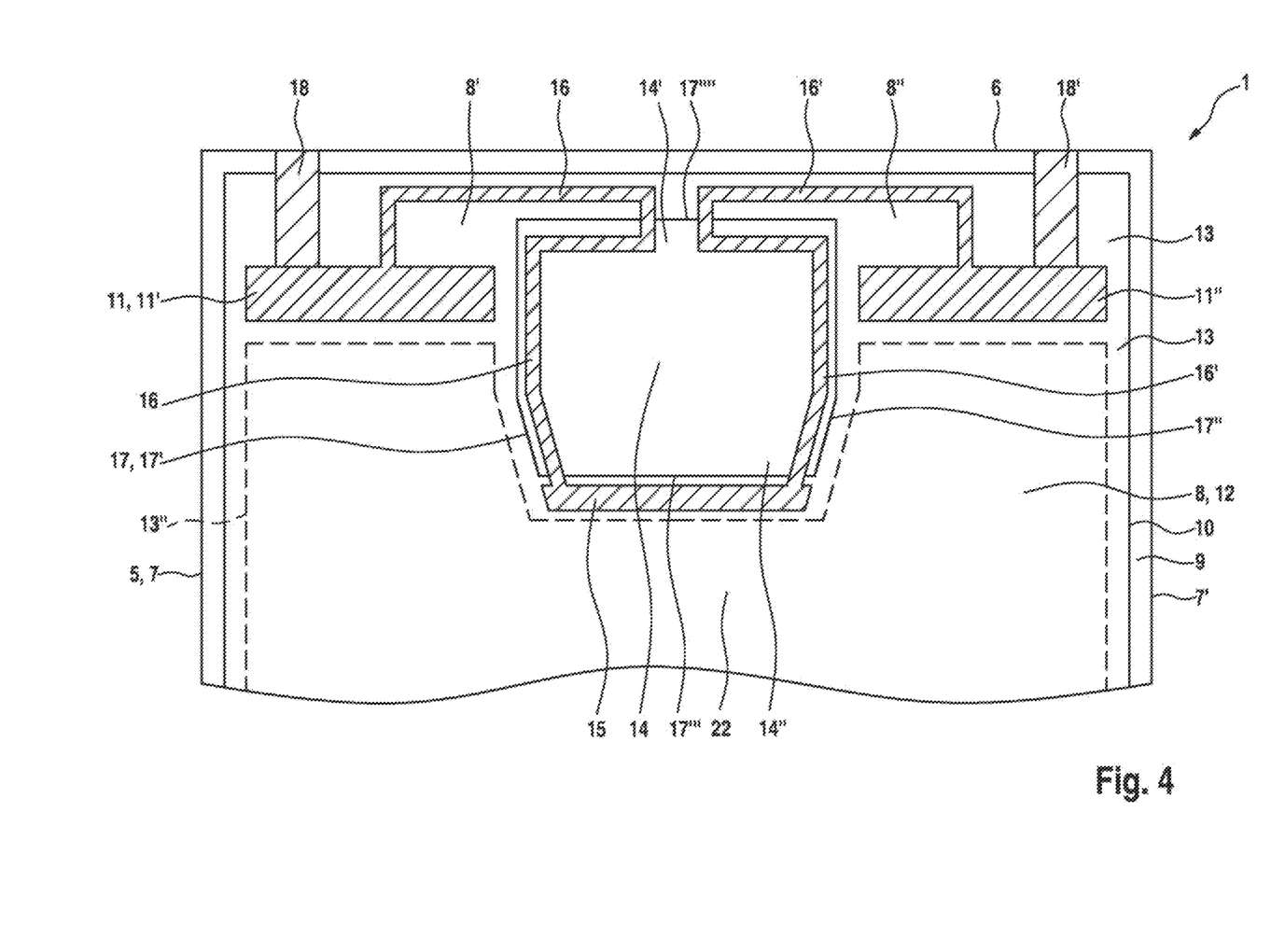
FIG. 4 a plan view of the essential detail from another embodiment of the windshield according to the invention.

The embodiment of the windshield 1 according to the invention of FIG. 4 (only the upper section of the windshield 1 is depicted) differs from the embodiments of the windshield 1 according to the invention of FIGS. 3 and 4 in the following significant characteristics:

The two flat conductors 18, 18' for the subregions 11', 11" are arranged in the region of the ends of the subregions 11', 11" that are adjacent the second sides 7, 7'.

The electrical supply lines 16, 16' run a longer distance over the subregions 8', 8" of the heatable coating 8 above the two subregions 11', 11" to the upper region 14' of the coating-free zone 14.

In the coating-free zone 14, the two supply lines 16, 16' run first along the upper zone edge 17"' and from there out along the lateral zone edges 17', 17" to the additional electrode 15, which is arranged outside the lower region 14" of the coating-free zone 14 below the lower zone edge 17"' such that it is galvanically coupled to the heating field section.

The invention claimed is:

1. A transparent pane, comprising:
    at least one electrically heatable coating connected to at least two collecting electrodes configured to establish an electrical connection to two poles of a voltage source, so that an applied supply voltage of the voltage source causes a heating current to flow via a heating field formed between the two collecting electrodes, wherein the heating field contains at least one coating-free zone bordered by a zone edge of the coating-free zone, the zone edge being formed, at least in sections, by the heatable coating, wherein at least one of the two collecting electrodes is subdivided into at least two subregions separated from one another, wherein at least one electrical supply line, of at least two electrical supply lines, is guided from each of the at least two subregions to at least one additional electrode, wherein the at least one electrical supply line runs, at least in sections,
- i) in the at least one coating-free zone, and/or
- ii) in a coating-free edge strip of the transparent pane, and/or
- iii) in at least one subregion of the heatable coating outside the heating field, and/or
- iv) at and/or in the zone edge of the at least one coating-free zone formed by the coating, and wherein
- a) the at least one additional electrode is electrically connected to ends of the at least two electrical supply lines and to a heating field section of the heating field between the two collecting electrodes, and/or
- b) the at least one additional electrode is subdivided into at least two subregions separated from one another, wherein each of the at least two subregions is electrically connected to, in each case, one end of a respective at least one electrical supply line of the at least two electrical supply lines as well as to the heating field section of the heating field between the two collecting electrodes.

2. The transparent pane according to claim 1, wherein each of the at least two subregions of at least one of the two collecting electrodes is electrically connected via at least one flat conductor to a voltage source.

3. The transparent pane according to claim 2, wherein each of the at least two subregions is connected via at least one flat conductor to a common voltage source.

4. The transparent pane according to claim 1 wherein the at least one additional electrode and/or at least one subregion of the at least one additional electrode has at least two connection sections, which extend into the heating field section of the heating field, between the at least one additional electrode and/or its at least two subregions, and at least one collecting electrode of the two collecting electrodes.

5. The transparent pane according to claim 1, wherein the at least one electrical supply line is arranged predominantly or entirely in the coating-free edge strip and/or the coating-free zone.

6. The transparent pane according to claim 1, wherein the at least two electrical supply lines are guided in sections through the at least two subregions of the coating outside the heating field.

7. The transparent pane according to claim 1, wherein the at least two electrical supply lines are guided in sections through an upper region of the coating-free zone in an installed state of the transparent pane.

8. The transparent pane according to claim 1, wherein the at least two electrical supply lines extend in sections along lateral zone edges of the at least one coating-free zone in an installed state of the transparent pane.

9. The transparent pane according to claim 1, wherein the at least one additional electrode, and/or each of its at least two subregions, extends along a lower zone edge in an installed state of the transparent pane.

10. The transparent pane according to claim 1, wherein the at least two subregions are electrically conductively connected via at least one connecting part to at least one flat conductor connected to a voltage source, and wherein the at least one flat conductor and the at least one connecting part are electrically isolated from the at least two electrical supply lines.

11. The transparent pane according to claim 10, wherein the at least two subregions are electrically conductively connected via a common connecting part to the flat conductor.

12. The transparent pane according to claim 10, wherein electrical isolation between, the at least one flat conductor and the at least one connecting part, and the at least two electrical supply lines is accomplished by means of an electrically insulating layer.

13. A method for producing a transparent pane, the method comprising the following process steps:
- A) producing an electrically heatable coating,
- B) producing at least one coating-free zone in the electrically heatable coating and in a heating field of the electrically heatable coating,
- C) forming at least two collecting electrodes provided for connection to two terminals of a voltage source, the at least two collecting electrodes being electrically connected to the electrically heatable coating so that by applying a supply voltage through the voltage source, a heating current flows via a heating field situated between the at least two collecting electrodes, wherein at least one of the two collecting electrodes is subdivided into at least two subregions separated from one another,
- D) producing at least one additional electrode provided for electrically connecting to at least one of the two collecting electrodes and/or at least two subregions, separated from one another, of the at least one additional electrode, and
- E) producing at least two electrical supply lines, which connect the at least one additional electrode and/or, in each case, one of its at least two subregions electrically to, in each case, at least one of the at least two subregions, separated from one another, of at least one of the collecting electrodes, wherein at least one of the at least two electrical supply lines is produced running, at least in sections,
- i) in the at least one coating-free zone, and/or
- ii) in the coating-free edge strip, and/or
- iii) in at least one subregion of the coating outside the heating field, and/or
- iv) at and/or in the zone edge, formed by the coating, of the at least one coating-free zone.

14. The method according to claim 13, wherein the process steps (C, (D, and (E can be performed simultaneously using a screen printing method.

15. The method according to claim 13, further comprising applying the transparent pane to a functional and/or decorative individual piece and as a built-in component in furniture, devices, buildings, and means of transportation.

* * * * *